US012528489B2

(12) United States Patent
Nakamura

(10) Patent No.: US 12,528,489 B2
(45) Date of Patent: Jan. 20, 2026

(54) SERVER APPARATUS, SYSTEM, AND OPERATING METHOD OF SYSTEM

(71) Applicant: TOYOTA JIDOSHA KABUSHIKI KAISHA, Toyota (JP)

(72) Inventor: Masashi Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 18/457,649

(22) Filed: Aug. 29, 2023

(65) Prior Publication Data

US 2024/0067205 A1    Feb. 29, 2024

(30) Foreign Application Priority Data

Aug. 30, 2022  (JP) ................. 2022-137248

(51) Int. Cl.
*B60W 50/14*    (2020.01)
*B60L 58/30*    (2019.01)

(52) U.S. Cl.
CPC ............. *B60W 50/14* (2013.01); *B60L 58/30* (2019.02); *B60L 2250/10* (2013.01); *B60L 2250/16* (2013.01); *B60W 2050/143* (2013.01); *B60W 2050/146* (2013.01); *B60W 2510/28* (2013.01); *B60W 2556/10* (2020.02); *B60W 2556/45* (2020.02)

(58) Field of Classification Search
CPC ........... B60W 50/14; B60W 2050/143; B60W 2050/146; B60W 2510/28; B60W 2556/10; B60W 2556/45; B60L 58/30; B60L 2250/10; B60L 2250/16; B60L 3/12; Y02E 60/50; Y02T 90/16

USPC ......................................................... 340/439
See application file for complete search history.

(56) References Cited

U.S. PATENT DOCUMENTS

| | | | |
|---|---|---|---|
| 2009/0226773 | A1 | 9/2009 | Takekawa |
| 2018/0109121 | A1* | 4/2018 | Uchida .................... B60L 58/21 |
| 2020/0156606 | A1* | 5/2020 | Switkes .................... G08G 1/22 |
| 2020/0364661 | A1* | 11/2020 | Yamasaki ............... B60L 58/16 |
| 2021/0078438 | A1* | 3/2021 | Murakami ........ H01M 8/04671 |
| 2021/0268927 | A1* | 9/2021 | Shimonishi ....... H01M 10/4207 |
| 2022/0080943 | A1* | 3/2022 | Liu .......................... B60L 58/16 |

FOREIGN PATENT DOCUMENTS

| | | | |
|---|---|---|---|
| JP | 2007-048540 A | | 2/2007 |
| JP | 2007-305327 A | | 11/2007 |
| JP | 2010-238476 A | | 10/2010 |
| JP | 2013-187178 A | | 9/2013 |
| JP | 2013187178 | * | 9/2013 |
| JP | 2018-063906 A | | 4/2018 |

* cited by examiner

Primary Examiner — Omar Casillashernandez
(74) Attorney, Agent, or Firm — Oliff PLC

(57) ABSTRACT

A server apparatus includes a communication interface, a memory, and a controller. The memory stores correspondence information associating a travel history of a first vehicle configured to run on a fuel cell as a power source with a state of deterioration of the fuel cell. The controller receives, via the communication interface, information on a travel history from a second vehicle configured to run on a fuel cell as a power source, and outputs a notification about the fuel cell of the second vehicle based on the information on the travel history and the correspondence information.

15 Claims, 7 Drawing Sheets

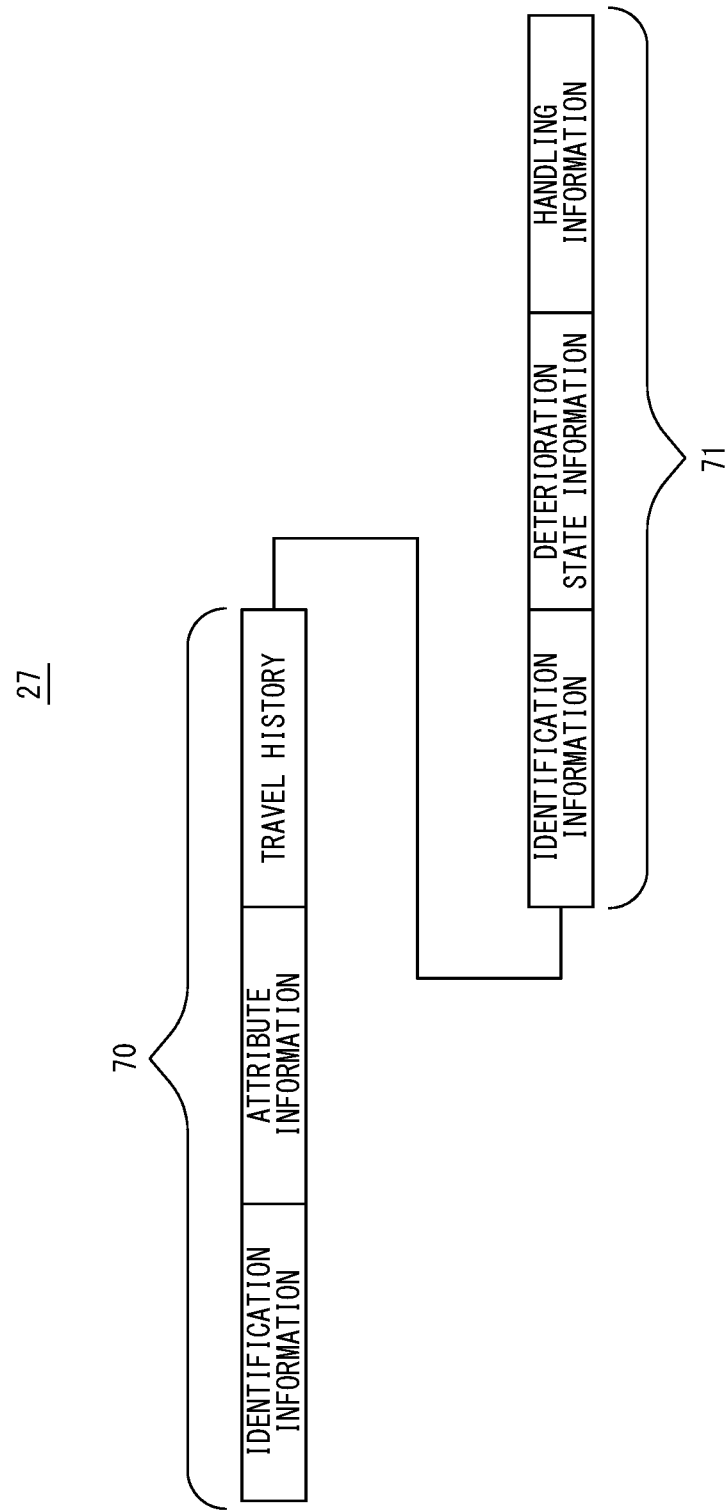

SERVER APPARATUS, SYSTEM, AND OPERATING METHOD OF SYSTEM

CROSS-REFERENCE TO RELATED APPLICATION

This application claims priority to Japanese Patent Application No. 2022-137248, filed on Aug. 30, 2022, the entire contents of which are incorporated herein by reference.

TECHNICAL FIELD

The present disclosure relates to a server apparatus, a system, and an operating method of a system.

BACKGROUND

In Fuel Cell Electric Vehicles (FCEVs), which run on fuel cells as their power source, deteriorated fuel cells need to be repaired or replaced in a timely manner. Therefore, various methods have been proposed to determine deterioration of fuel cells. For example, Patent Literature (PTL) 1 discloses technology for determining deterioration by a decrease in output of a fuel cell. PTL 2 discloses a method for repairing pinholes occurring in the electrolyte membrane of a fuel cell.

CITATION LIST

Patent Literature

PTL 1: JP 2010-238476 A
PTL 2: JP 2007-048540 A

SUMMARY

There is room for increased efficiency in the determination of deterioration of a fuel cell.

It would be helpful to disclose a server apparatus and the like that enable efficient determination of deterioration of a fuel cell in an FCEV.

A server apparatus in the present disclosure includes:
a communication interface;
a memory configured to store correspondence information associating a travel history of a first vehicle configured to run on a fuel cell as a power source with a state of deterioration of the fuel cell; and
a controller configured to receive, via the communication interface, information on a travel history from a second vehicle configured to run on a fuel cell as a power source, and output a notification about the fuel cell of the second vehicle based on the information on the travel history and the correspondence information.

A system in the present disclosure is a system including vehicles configured to run on a fuel cell as a power source and a server apparatus configured to communicate with the vehicle, wherein
the server apparatus is configured to store correspondence information associating a travel history of a first vehicle with a state of deterioration of a fuel cell of the first vehicle, receive information on a travel history from a second vehicle, and output a notification about a fuel cell of the second vehicle based on the information on the travel history and the correspondence information, and
the second vehicle is configured to receive the notification.

An operating method of a system in the present disclosure is an operating method of a system including vehicles configured to run on a fuel cell as a power source and a server apparatus configured to communicate with the vehicle, the operating method including:
storing, by the server apparatus, correspondence information associating a travel history of a first vehicle with a state of deterioration of a fuel cell of the first vehicle, receiving information on a travel history from a second vehicle, and outputting a notification about a fuel cell of the second vehicle based on the information on the travel history and the correspondence information; and
receiving, by the second vehicle, the notification.

According to the server apparatus and the like in the present disclosure, deterioration of a fuel cell in an FCEV can be determined efficiently.

BRIEF DESCRIPTION OF THE DRAWINGS

In the accompanying drawings:

FIG. 7 is a diagram illustrating an example of correspondence information.

DETAILED DESCRIPTION

Embodiments are described below.

Figure 1:
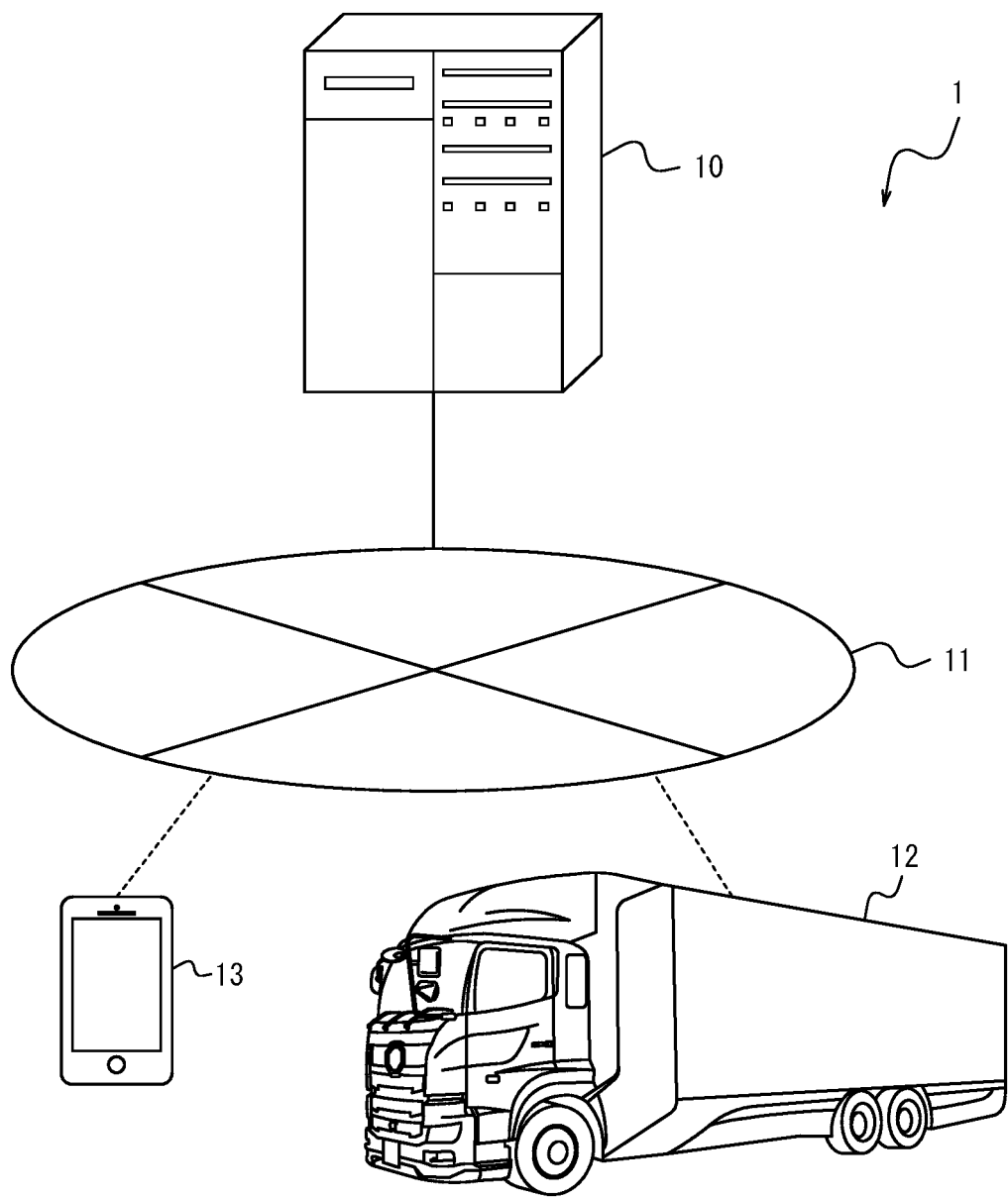
FIG. 1 is a diagram illustrating an example configuration of an information provision system.

FIG. 1 is a diagram illustrating an example configuration of an information provision system in an embodiment. An information provision system 1 includes one or more each of a server apparatus 10, a vehicle 12, and a terminal apparatus 13 communicably connected to each other via a network 11. The server apparatus 10 is, for example, a server computer that belongs to a cloud computing system or other computing system and functions as a server that implements various functions. The vehicle 12 is a FCEV, such as a passenger car, bus, truck, or work vehicle, that runs on a fuel cell as a power source, is equipped with a communication function and an information processing function, and is connected to the network 11 via a mobile communication network. The vehicle 12 is driven manually, but a portion of driving may be automated. Examples of the terminal apparatus 13 include a smartphone, a tablet terminal, and a personal computer (PC) used by a technician in a maintenance shop for the vehicle 12. The network 11 is the Internet, for example, but may also be an ad-hoc network, a LAN, a Metropolitan Area Network (MAN), other networks, or a combination of two or more thereof.

The server apparatus 10 stores correspondence information associating a travel history of the vehicle 12 that runs on a fuel cell as a power source with a state of deterioration of that fuel cell. The state of deterioration of the fuel cell of the vehicle 12 is measured when the vehicle 12 is serviced or inspected at a maintenance shop, for example for a periodic inspection or due to failure, and is stored in the server apparatus 10 as part of the correspondence information. The server apparatus 10 then receives information on the travel history from another vehicle 12 and outputs a notification about a fuel cell of the other vehicle 12 based on the information on the travel history and the correspondence information. The notification is, for example, transmitted to the other vehicle 12 and presented to an occupant. The notification includes information indicating the state of deterioration of the fuel cell, which is derived in association with the travel history, and how to handle a deteriorated fuel cell. Examples of handling include inspection and maintenance of the fuel cell and replacement for reuse. According to the present embodiment, after the server apparatus 10 stores the correspondence information, the occupant of the vehicle 12 can receive notifications from the server apparatus 10 in order to learn the state of deterioration of the fuel cell without having to take the vehicle 12 to a maintenance shop. Deterioration of the fuel cell in an FCEV can thus be determined efficiently. The occupant can also confirm how to handle a deteriorated fuel cell via the notification. This can optimize the use of fuel cells.

Figure 2:
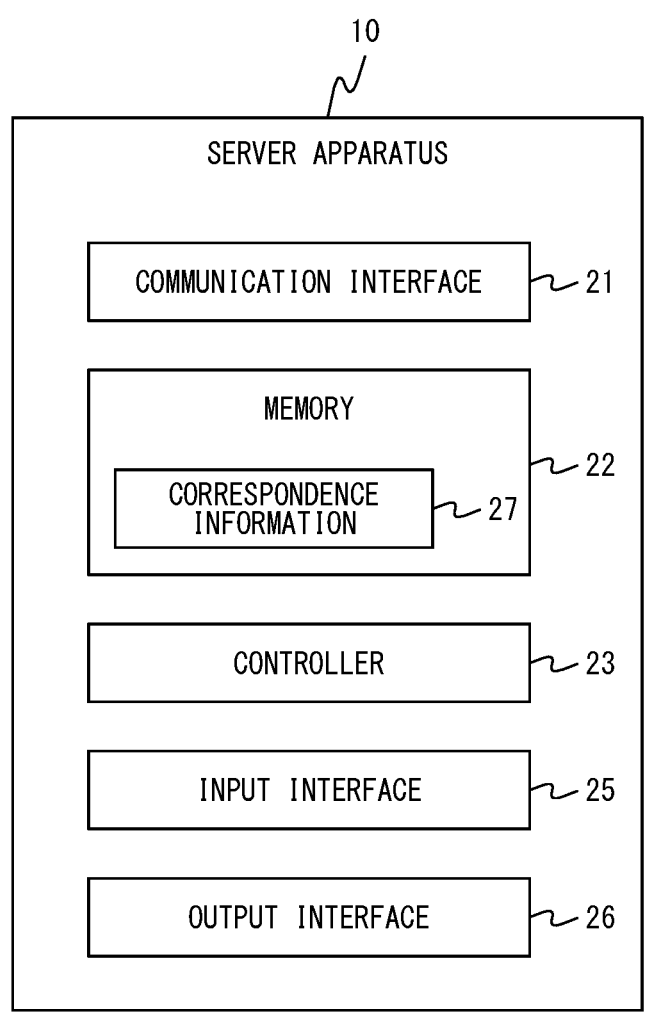
FIG. 2 is a diagram illustrating an example configuration of a server apparatus.

FIG. 2 illustrates an example configuration of the server apparatus 10. The server apparatus 10 includes a communication interface 21, a memory 22, a controller 23, an input interface 25, and an output interface 26. The server apparatus 10 is, for example, a single computer. The server apparatus 10 may be two or more computers that are communicably connected to each other and operate in cooperation. In this case, the configuration illustrated in FIG. 2 can be arranged among two or more computers as appropriate.

The communication interface 21 includes one or more interfaces for communication. The interface for communication is, for example, a LAN interface. The communication interface 21 receives information to be used for the operations of the server apparatus 10 and transmits information obtained by the operations of the server apparatus 10. The server apparatus 10 is connected to the network 11 by the communication interface 21 and communicates information with the vehicle 12 or the terminal apparatus 13 via the network 11.

The memory 22 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 22 stores information to be used for the operations of the server apparatus 10 and information obtained by the operations of the server apparatus 10. The memory 22 stores correspondence information 27. The correspondence information 27 is information associating the travel history of a vehicle 12 with the state of deterioration of the fuel cell.

The controller 23 includes one or more processors, one or more dedicated circuits, or a combination thereof. The processor is a general purpose processor, such as a Central Processing Unit (CPU), or a dedicated processor, such as a Graphics Processing Unit (GPU), specialized for a particular process. The dedicated circuit is, for example, a Field-Programmable Gate Array (FPGA), an Application Specific Integrated Circuit (ASIC), or the like. The controller 23 executes information processing related to operations of the server apparatus 10 while controlling components of the server apparatus 10.

The input interface 25 includes one or more interfaces for input. The interface for input is, for example, a physical key, a capacitive key, a pointing device, a touch screen integrally provided with a display, or a microphone that receives audio input. The input interface 25 accepts operations to input information used for operation of the server apparatus 10 and transmits the inputted information to the controller 23.

The output interface 26 includes one or more interfaces for output. The interface for output is, for example, a display or a speaker. The display is, for example, a Liquid Crystal Display (LCD) or an organic Electro Luminescent (EL) display. The output interface 26 outputs information obtained by the operations of the server apparatus 10.

The functions of the server apparatus 10 are realized by a processor included in the controller 23 executing a control program. The control program is a program for causing a computer to execute the processing of steps included in the operations of the server apparatus 10, thereby enabling the computer to realize the functions corresponding to the processing of the steps. That is, the control program is a program for causing a computer to function as the server apparatus 10. Some or all of the functions of the server apparatus 10 may be realized by a dedicated circuit included in the controller 23. The control program may be stored on a non-transitory recording/storage medium readable by the server apparatus 10 and be read from the medium by the server apparatus 10.

Figure 3:
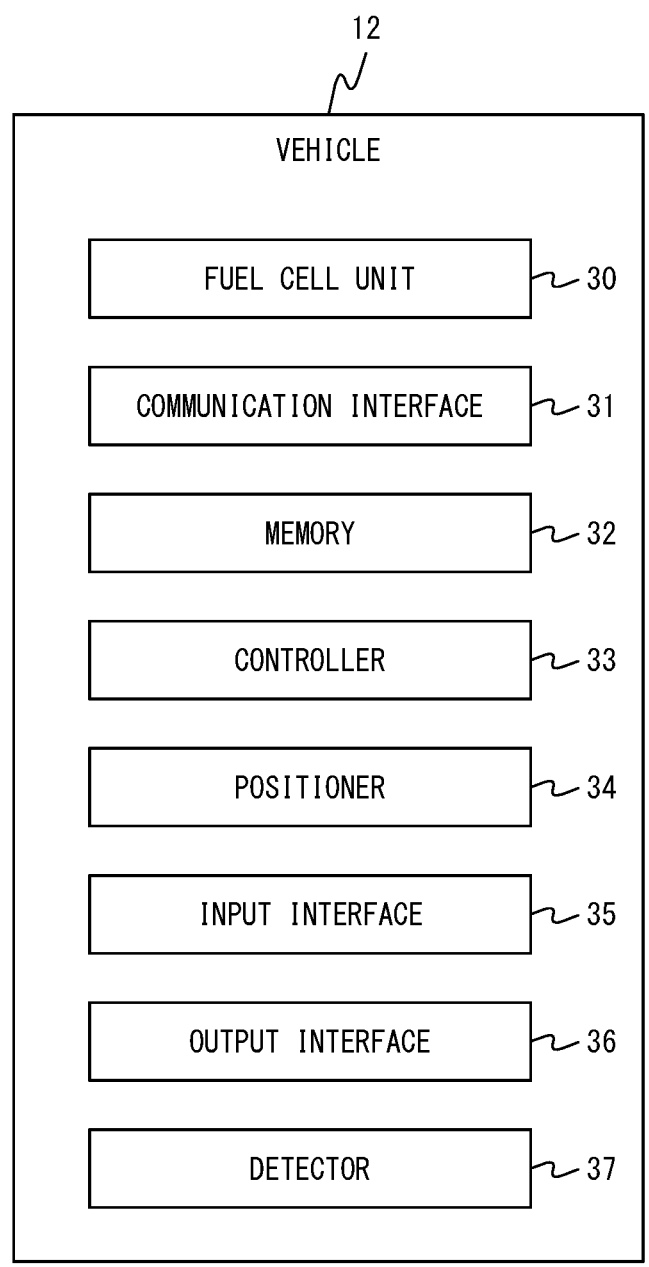
FIG. 3 is a diagram illustrating an example configuration of a vehicle.

FIG. 3 illustrates an example configuration of the vehicle 12 related to the present embodiment. In addition to a fuel cell unit 30, which includes a fuel cell as a power source, the vehicle 12 includes a communication interface 31, a memory 32, a controller 33, a positioner 34, an input interface 35, an output interface 36, and a detector 37. The communication interface 31, the memory 32, the controller 33, the positioner 34, the input interface 35, the output interface 36, and the detector 37 may be configured as a single control apparatus, by two or more control apparatuses, or by other apparatuses, such as a control apparatus and a communication device. The control apparatus includes an electronic controller (ECU), for example. The communication device includes a data communication module (DCM), for example. The control apparatus may be configured to include a personal computer, a tablet terminal, a smartphone terminal, a navigation apparatus, or the like. The components are communicably connected to each other, or to other devices and apparatuses in the vehicle 12, by an in-vehicle network compliant with standards such as a controller area network (CAN).

The fuel cell unit 30 includes a fuel cell and corresponding control circuitry. The fuel cell generates water and electricity from hydrogen supplied by a hydrogen station or other source and oxygen in the air. The generated electricity is used to drive the vehicle 12.

The communication interface 31 includes one or more interfaces for communication. Examples of the interface for communication include an interface corresponding to mobile communication standards, such as Long Term Evolution (LTE), 4th Generation (4G), or 5th Generation (5G). The communication interface 31 receives information to be used for the operations of the controller 33 and transmits information obtained by the operations of the controller 33. The controller 33 connects to the network 11 using the communication interface 31 through a mobile communication base station and communicates information with other apparatuses via the network 11.

The memory 32 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information to be used for the operations of the controller 33 and information obtained by the operations of the controller 33.

The controller 33 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 33 executes information processing related to operations of the vehicle 12 while controlling the components of the controller 33.

The positioner 34 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioner 34 acquires the positional information for the vehicle 12 and transmits the positional information to the controller 33.

The input interface 35 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 35 accepts user operations to input information used for operation of the controller 33 and transmits the inputted information to the controller 33.

The output interface 36 includes one or more interfaces for output. The interface for output is, for example, a display or a speaker. The display is, for example, an LCD or an organic EL display. The output interface 36 outputs the information obtained by the operation of controller 33, for example, to the user.

The detector 37 includes one or more sensors, or interfaces with sensors, that detect the condition or operation of various components in the vehicle 12 and transmits information indicating the results of detection by the sensors to the controller 33. Sensors detect vehicle speed, acceleration, and the like.

The functions of the controller 33 are realized by a processor included in the controller 33 executing a control program. The control program is a program for causing a computer to execute the processing of steps included in operations of the controller 33, thereby enabling the computer to realize the functions corresponding to the processing of the steps. That is, the control program is a program for causing a computer to function as the controller 33. Some or all of the functions of the controller 33 may be realized by a dedicated circuit included in the controller 33.

The controller 33 generates information for control of various mechanisms and apparatuses of the vehicle 12 and transmits the information for control to the control circuits of the various mechanisms and apparatuses to control the mechanisms and apparatuses. The controller 33 may support driving operations by controlling mechanisms that accept driving operations.

Figure 4:
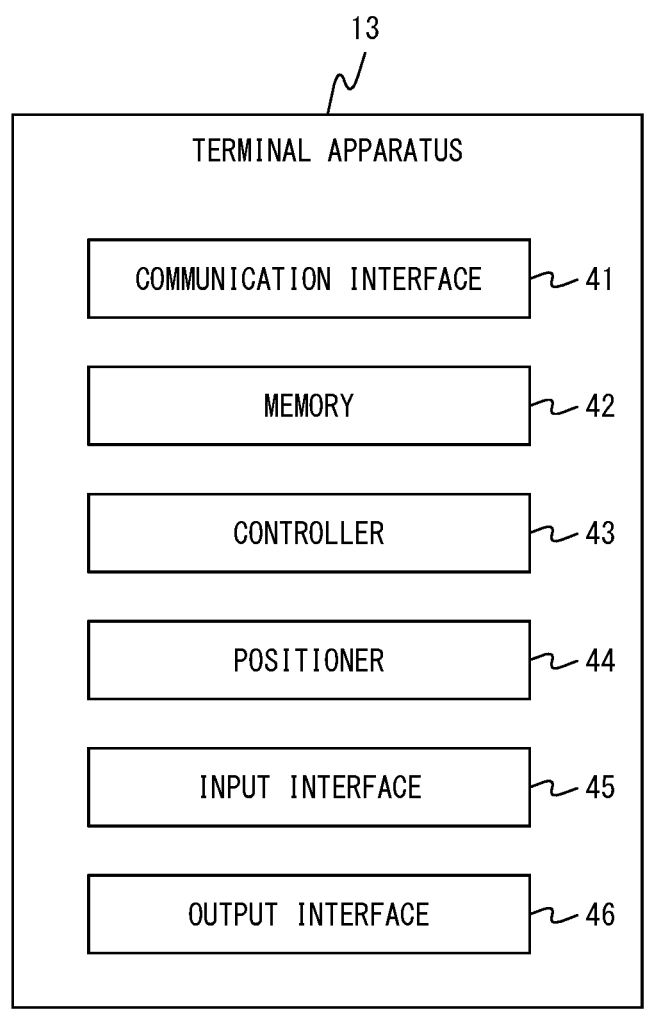
FIG. 4 is a diagram illustrating an example configuration of a terminal apparatus.

FIG. 4 is a diagram illustrating a configuration of the terminal apparatus 13. The terminal apparatus 13 is, for example, an information terminal apparatus such as a smartphone, a tablet terminal apparatus, or a personal computer.

The terminal apparatus 13 includes a communication interface 41, a memory 42, a controller 43, an input interface 45, and an output interface 46. The terminal apparatus 13 may include a positioner 44.

The communication interface 41 includes a communication module compliant with a wired or wireless LAN standard, a module compliant with a mobile communication standard such as LTE, 4G, or 5G, or the like. The terminal apparatus 13 connects to the network 11 via a nearby router apparatus or mobile communication base station using the communication interface 41 and communicates information with other apparatuses over the network 11.

The memory 42 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores information to be used for the operations of the controller 43 and information obtained by the operations of the controller 43.

The controller 43 has one or more general purpose processors such as CPUs or micro processing units (MPUs) or one or more dedicated processors that are dedicated to specific processing. Alternatively, the controller 43 may have one or more dedicated circuits such as FPGAs or ASICs. The controller 43 is configured to perform overall control of the operations of the terminal apparatus 13 by operating according to the control/processing programs or operating according to operation procedures implemented in the form of circuits. The controller 43 then transmits and receives various types of information to and from the server apparatus 10 and the like via the communication interface 41 and executes the operations according to the present embodiment.

The positioner 44 includes one or more GNSS receivers. GNSS includes, for example, GPS, QZSS, BeiDou, GLONASS, and/or Galileo. The positioner 44 acquires the positional information for the terminal apparatus 13 and transmits the positional information to the controller 43.

The input interface 45 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 45 accepts operations for inputting information to be used in the operations of the controller 43 and transmits the inputted information to the controller 43.

The output interface 46 includes one or more interfaces for output. The interface for output is, for example, a display or a speaker. The display is, for example, an LCD or an organic EL display. The output interface 46 outputs information obtained by the operations of the controller 43.

The functions of the controller 43 are realized by a processor included in the controller 43 executing a control program. The control program is a program for causing the processor to function as the controller 43. Some or all of the functions of the controller 43 may be realized by a dedicated circuit included in the controller 43.

Figure 5:
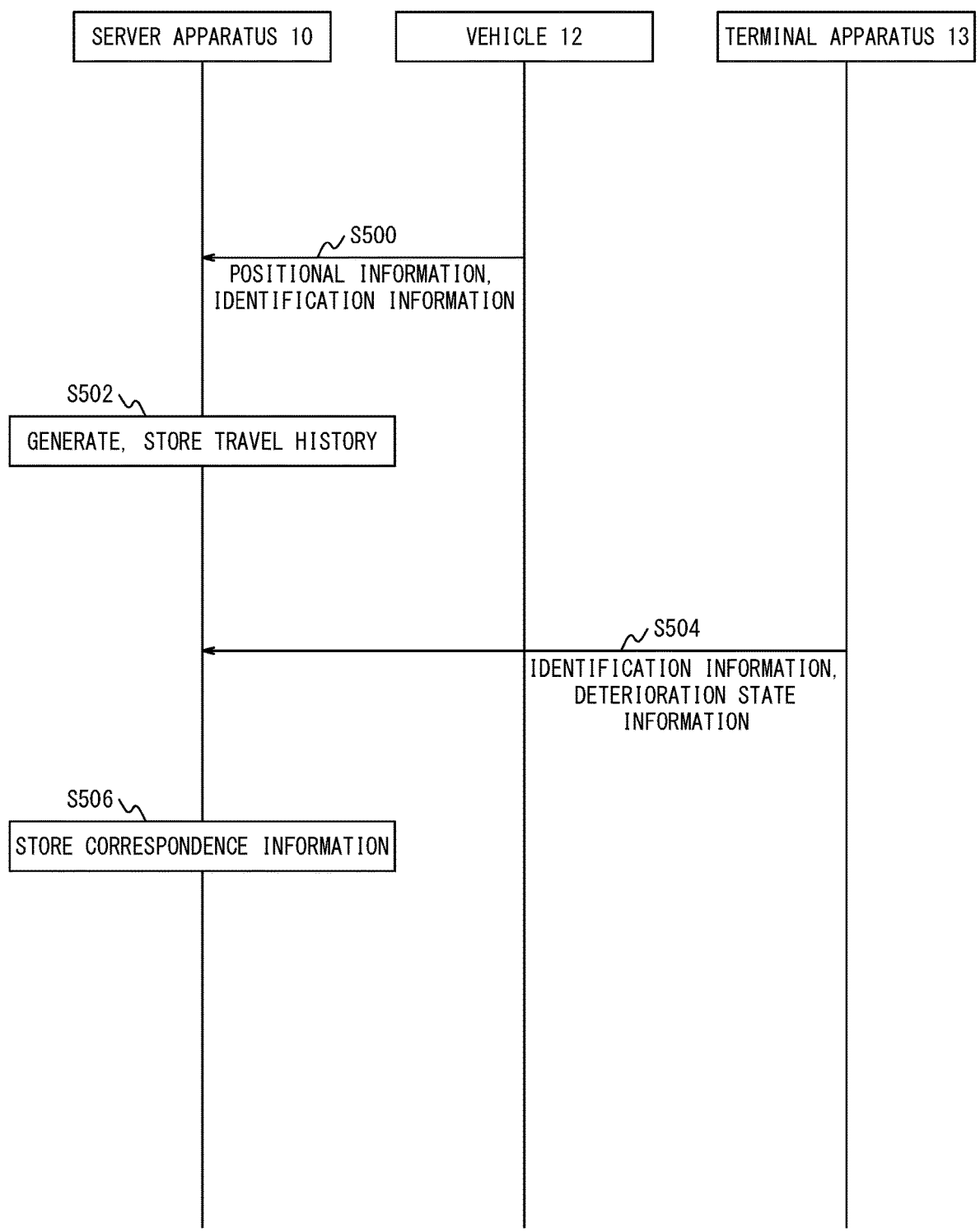
FIG. 5 is a sequence diagram illustrating an example of operations of an information provision system.
Figure 6:
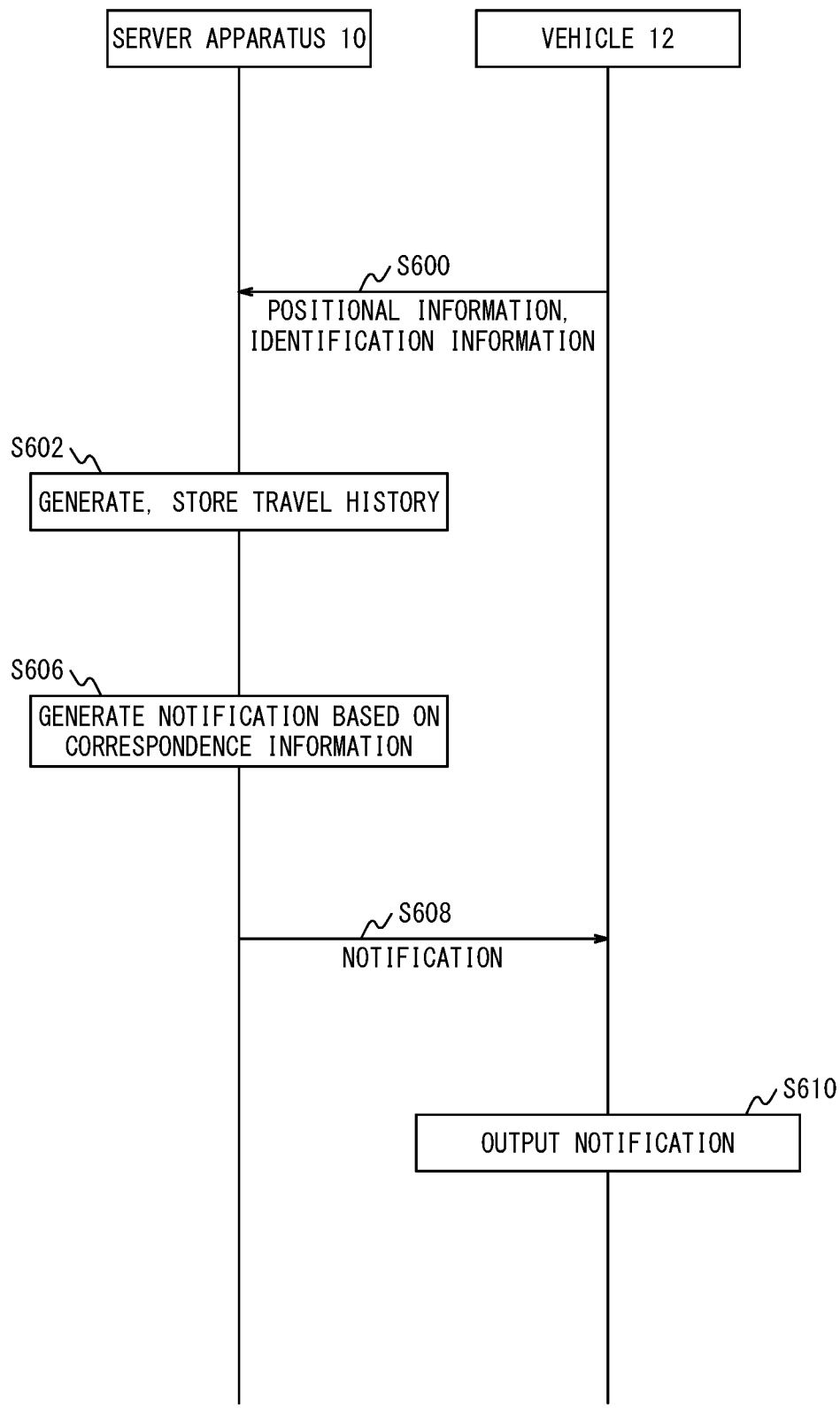
FIG. 6 is a sequence diagram illustrating an example of operations of an information provision system.

FIGS. 5 and 6 are sequence diagrams to illustrate the operation procedures of the information provision system 1 in the present embodiment. FIGS. 5 and 6 illustrate the steps in the coordinated operation of the server apparatus 10, the vehicle 12, and the terminal apparatus 13. The server apparatus 10 can perform the procedures illustrated in FIGS. 5 and 6 for each of the one or more vehicles 12 or for each of the one or more terminal apparatuses 13.

The steps pertaining to the various information processing by the server apparatus 10, the vehicle 12, and the terminal apparatus 13 in FIGS. 5 and 6 are performed by the respective controllers 23, 33, 43. The steps pertaining to transmitting and receiving various types of information to and from the server apparatus 10, the vehicle 12, and the terminal apparatus 13 are performed by the respective controllers 23, 33, 43 transmitting and receiving information to and from each other via the respective communication interfaces 21, 31, 41. In the server apparatus 10, the vehicle 12, and the terminal apparatus 13, the respective controllers 23, 33, 43 appropriately store the information that is transmitted and received in the respective memories 22, 32, 42. Furthermore, the controllers 23, 33, 43 accept input of various information by the respective input interfaces 35, 45 and output various information by the respective output interfaces 36, 46.

FIG. 5 illustrates procedures for the server apparatus 10 to store the correspondence information 27.

In step S500, the vehicle 12 transmits its own positional information together with identification information to the server apparatus 10. The positional information is generated by the controller 33 using information acquired by the positioner 34. The identification information is stored in the memory 32 in advance. In a case in which there is a plurality of vehicles 12, each vehicle 12 transmits its own positional information to the server apparatus 10. Information such as vehicle speed and acceleration of the vehicle 12 may be added to the positional information. The server apparatus 10 receives the information transmitted from the vehicle 12. Step S500 is performed in any appropriate cycles (for example, in cycles of several milliseconds to several seconds). The server apparatus 10 stores a history of the positional information and the like for each vehicle 12.

In step S502, the server apparatus 10 generates and stores a travel history for each vehicle 12. The server apparatus 10 generates the travel history using the history of the positional information and the like for each vehicle 12 and the map information stored in the memory 22 in advance. The travel history includes information such as the position and time of the start and end of travel, travel time, travel distance, travel route, and travel area. The travel area is the type of area through which the travel route passes and is freely defined in advance in relation to the map information. The travel area is a distinction between, for example, urban, residential, suburban, mountainous, and coastal areas. Step S502 is performed in any appropriate cycles (for example, in cycles of several minutes to several hours), and the travel history is updated.

Steps S500 and S502 are each executed periodically, and the travel history of the vehicle 12 is updated. Steps S504 and S506 are then executed when the vehicle 12 is brought to a maintenance shop for servicing and inspection.

In step S504, the terminal apparatus 13 transmits the identification information for the vehicle 12 together with deterioration state information to the server apparatus 10. The identification information and the deterioration state information are inputted to the terminal apparatus 13 by an operator. The identification information may be transmitted from the vehicle 12 to the terminal apparatus 13 by wireless communication. The deterioration state information is information about the state of deterioration of the fuel cell of the vehicle 12 and includes information about the position of the deteriorated cell, the deteriorated section, and the degree of deterioration of the fuel cell. An operator uses an inspection apparatus to detect the state of deterioration of the fuel cell. For example, the inspection apparatus measures the current and voltage of each cell in the fuel cell to derive the IV (current-voltage) characteristics and compares the IV characteristics between cells. Based on the comparison of IV characteristics, the inspection apparatus uses any appropriate algorithm to estimate the position of the deteriorated cell and the deteriorated section, as well as the degree of deterioration, by determining that the IV characteristics have decreased below any appropriate reference. For example, in a case in which the cell on the edge of a stack has deteriorated, it can be inferred that the membrane has deteriorated. In a case in which a cell near the center has deteriorated, it can be inferred that the catalyst has deteriorated. In a case in which the cell around the 10th position from the edge is extremely deteriorated, it can be inferred that a foreign substance entered the cell during the manufacturing process and caused a short circuit, or that the cell itself was defective to begin with. Alternatively, in a case in which each cell is uniformly deteriorated, it can be inferred that the deterioration is age related. The degree of deterioration of the fuel cell is freely set to any of several levels depending on, for example, the position, number, and IV characteristics of the deteriorated cell, and the degree of deterioration is determined according to the settings. For example, the degree of deterioration may be "low" when the membrane or catalyst is inferred to be deteriorated, "medium" when a short circuit or defect in the cell itself is inferred, and "high" when age-related deterioration is inferred. Information on the IV characteristics of the cells may be transmitted from the terminal apparatus 13 to the server apparatus 10, and the server apparatus 10 may determine the state of deterioration and generate the deterioration state information.

In step S506, the server apparatus 10 generates the correspondence information 27. As illustrated in FIG. 7, the server apparatus 10 generates the correspondence information 27 by associating the history information 70, including the travel history, and fuel cell information 71, including the deterioration state information, with the identification information for the vehicle 12. The history information 70 includes the identification information, attribute information, the travel history, and the like for the vehicle 12. The attribute information is information indicating the attributes of the vehicle 12, for example derived from the identification information, and includes information on the type of vehicle 12 and the load. For example, the type of vehicle 12 includes items such as passenger car, bus (large, medium, small, etc.), truck (large, medium, small, etc.), and work vehicle. The load represents the expected number of occupants, the payload, and the like. Such attribute information may be stored in advance in the server apparatus 10 and associated with the identification information on the server apparatus 10 or may be transmitted from the vehicle 12 in addition to the identification information. The fuel cell information 71 includes the identification information for the vehicle 12, the deterioration state information for the fuel cell, handling information, and the like. The handling information is information indicating how to handle the fuel cell and is set freely according to the state of deterioration of the fuel cell. The handling information includes, for example, items such as fuel cell repair/inspection and fuel cell replacement. For example, fuel cell repair/inspection is associated with a degree of deterioration of "low" or "medium", whereas fuel cell replacement is associated with a degree of deterioration of "high". Alternatively, the fuel cell replacement can be associated under more stringent conditions, depending on the attributes of the vehicle 12. For example, in the case of the vehicle 12 being a large bus, truck, or other vehicle with a relatively large payload, or a work vehicle such as a forklift, a larger output is required compared to other types. Fuel cell replacement may therefore be associated under the condition that the degree of deterioration of the fuel cell exceeds any appropriate reference.

Alternatively, the correspondence information 27 may be a determination model for deriving the handling information that corresponds to the attribute information, travel history, and the like of the vehicle 12. The determination model is generated by machine learning of teacher data in which handling information is associated in advance with attribute information, travel history, deterioration state information, and the like of the vehicle 12. For example, in the case of continuous driving for a long time, or when driving with a heavy load in mountainous areas or the like, deterioration of the membrane progresses, and the cells on the edge tend to deteriorate. Fuel cell repair/inspection is therefore derived as the handling method.

FIG. 5 illustrates an example in which the server apparatus 10 generates and updates the travel history for the vehicle 12 based on the positional information for the vehicle 12. The travel history may, however, be generated and updated on the vehicle 12, and in step S504, the terminal apparatus 13 may transmit the travel history acquired from the vehicle 12 by wireless communication or the like to the server apparatus 10.

FIG. 6 illustrates the procedures for the server apparatus 10 to output a notification to the vehicle 12. The vehicle 12 performing the operations in FIG. 6 may be the same vehicle as the vehicle 12 performing the operations in FIG. 5 or may be a different vehicle.

In step S600, the vehicle 12 transmits its own positional information together with identification information to the server apparatus 10. The attribute information may be added to the identification information. In a case in which there is a plurality of vehicles 12, each vehicle 12 transmits its own positional information to the server apparatus 10. Step S600 is performed in any appropriate cycles (for example, in cycles of several milliseconds to several seconds). The server apparatus 10 stores the history of the positional information for each vehicle 12.

In step S602, the server apparatus 10 generates and stores a travel history for each vehicle 12. The server apparatus 10 generates the travel history using the history of the positional information for each vehicle 12 and the map information stored in the memory 22 in advance. The travel history includes information such as the position and time of the start and end of travel, travel time, travel distance, travel route, and travel area. Step S602 is performed in any appropriate cycles (for example, in cycles of several minutes to several hours), and the travel history is updated.

Steps S600 and S602 are each executed periodically, and the travel history of the vehicle 12 is updated.

In step S606, the server apparatus 10 generates the notification for the vehicle 12 based on the correspondence information 27. The notification includes information indicating the state of deterioration of the fuel cell, derived in association with the travel history, and how to handle the deteriorated fuel cell. The server apparatus 10 extracts the travel history that best matches the travel history of the vehicle 12 in the history information 70 within the correspondence information 27. The server apparatus 10 uses the identification information to identify the fuel cell information 71 corresponding to the extracted travel history. The server apparatus 10 then generates a notification that includes the deterioration state information and handling information for the identified fuel cell information 71.

In step S608, the server apparatus 10 transmits the notification to the vehicle 12. The vehicle 12 receives the notification.

In step S610, the vehicle 12 outputs the notification. For example, the vehicle 12 outputs the notification by display or audio via the output interface 46. In this way, the occupant can confirm the state of deterioration of the fuel cell and how to handle the fuel cell, and the occupant can handle the fuel cell appropriately.

FIG. 6 illustrates an example in which the server apparatus 10 generates and updates the travel history for the vehicle 12 based on the positional information for the vehicle 12. Instead of steps S600 and S602, however, the travel history may be generated and updated on the vehicle 12, and the vehicle 12 may transmit the travel history to the server apparatus 10.

Such operation of the information provision system 1 enables the occupant of the vehicle 12 to learn the state of deterioration of the fuel cell without having to take the vehicle 12 to a maintenance shop. Deterioration of the fuel cell in an FCEV can thus be determined efficiently. The occupant can also confirm how to handle a deteriorated fuel cell via the notification. This can optimize the use of fuel cells.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

Examples of some embodiments of the present disclosure are described below. However, it should be noted that the embodiments of the present disclosure are not limited to these examples.

[Appendix 1] A server apparatus comprising:
 a communication interface;
 a memory configured to store correspondence information associating a travel history of a first vehicle configured to run on a fuel cell as a power source with a state of deterioration of the fuel cell; and
 a controller configured to receive, via the communication interface, information on a travel history from a second vehicle configured to run on a fuel cell as a power source, and output a notification about the fuel cell of the second vehicle based on the information on the travel history and the correspondence information.

[Appendix 2] The server apparatus according to appendix 1, wherein the correspondence information includes information on an attribute of the first vehicle.

[Appendix 3] The server apparatus according to appendix 1 or 2, wherein the travel history in the correspondence information includes information on a travel route of the first vehicle.

[Appendix 4] The server apparatus according to any one of appendices 1 to 3, wherein the notification includes information on how to handle the fuel cell of the second vehicle.

[Appendix 5] The server apparatus according to any one of appendices 1 to 4, wherein the state of deterioration of the fuel cell of the first vehicle is determined based on a position of a deteriorated cell in the fuel cell.

[Appendix 6] The server apparatus according to appendix 5, wherein the position of the deteriorated cell in the fuel cell of the first vehicle is estimated based on a current-voltage characteristic of the fuel cell.

[Appendix 7] A system comprising a vehicle configured to run on a fuel cell as a power source and a server apparatus configured to communicate with the vehicle, wherein
the server apparatus is configured to store correspondence information associating a travel history of a first vehicle with a state of deterioration of a fuel cell of the first vehicle, receive information on a travel history from a second vehicle, and output a notification about a fuel cell of the second vehicle based on the information on the travel history and the correspondence information, and
the second vehicle is configured to receive the notification.

[Appendix 8] The system according to appendix 7, wherein the correspondence information includes information on an attribute of the first vehicle.

[Appendix 9] The system according to appendix 7 or 8, wherein the travel history in the correspondence information includes information on a travel route of the first vehicle.

[Appendix 10] The system according to any one of appendices 7 to 9, wherein the notification includes information on how to handle the fuel cell of the second vehicle.

[Appendix 11] The system according to any one of appendices 7 to 10, wherein the state of deterioration of the fuel cell of the first vehicle is determined based on a position of a deteriorated cell in the fuel cell.

[Appendix 12] The system according to appendix 11, wherein the position of the deteriorated cell in the fuel cell of the first vehicle is estimated based on a current-voltage characteristic of the fuel cell.

[Appendix 13] An operating method of a system comprising a vehicle configured to run on a fuel cell as a power source and a server apparatus configured to communicate with the vehicle, the operating method comprising:
storing, by the server apparatus, correspondence information associating a travel history of a first vehicle with a state of deterioration of a fuel cell of the first vehicle, receiving information on a travel history from a second vehicle, and outputting a notification about a fuel cell of the second vehicle based on the information on the travel history and the correspondence information; and
receiving, by the second vehicle, the notification.

[Appendix 14] The operating method according to appendix 13, wherein the correspondence information includes information on an attribute of the first vehicle.

[Appendix 15] The operating method according to appendix 13 or 14, wherein the travel history in the correspondence information includes information on a travel route of the first vehicle.

[Appendix 16] The operating method according to any one of appendices 13 to 15, wherein the notification includes information on how to handle the fuel cell of the second vehicle.

[Appendix 17] The operating method according to any one of appendices 13 to 16, wherein the state of deterioration of the fuel cell of the first vehicle is determined based on a position of a deteriorated cell in the fuel cell.

[Appendix 18] The operating method according to appendix 17, wherein the position of the deteriorated cell in the fuel cell of the first vehicle is estimated based on a current-voltage characteristic of the fuel cell.

The invention claimed is:

1. A server apparatus comprising:
a communication interface;
a memory storing correspondence information associating a travel history of a first vehicle configured to run on a fuel cell as a power source with a state of deterioration of the fuel cell determined based on a position of a deteriorated cell in the fuel cell; and
a controller configured to
receive, via the communication interface, information on a travel history from a second vehicle configured to run on a fuel cell as a power source, and
transmit, via the communication interface to the second vehicle, a notification about the fuel cell of the second vehicle based on the information on the travel history of the second vehicle and the correspondence information,
wherein the state of deterioration of the fuel cell of the first vehicle is determined to be:
deterioration of a membrane when the position of the deteriorated cell in the fuel cell of the first vehicle is on an edge of a stack of cells of the fuel cell;
deterioration of a catalyst when the position of the deteriorated cell in the fuel cell of the first vehicle is near a center of the stack of the cells of the fuel cell;
existence of a contaminated or defective cell when the position of the deteriorated cell in the fuel cell of the first vehicle is a predetermined position from the edge of the stack of the cells of the fuel cell; and
age related deterioration when each of the cells in the fuel cell of the first vehicle is uniformly deteriorated.

2. The server apparatus according to claim 1, wherein the correspondence information includes information on an attribute of the first vehicle.

3. The server apparatus according to claim 1, wherein the travel history in the correspondence information includes information on a travel route of the first vehicle.

4. The server apparatus according to claim 1, wherein the notification includes information on how to handle the fuel cell of the second vehicle.

5. The server apparatus according to claim 1, wherein the position of the deteriorated cell in the fuel cell of the first vehicle is estimated based on a current-voltage characteristic of each cell in the fuel cell of the first vehicle.

6. A system comprising first and second vehicles each configured to run on a fuel cell as a power source and a server apparatus configured to communicate with the first and second vehicles,
wherein the server apparatus comprises:
a communication interface;
a memory storing correspondence information associating a travel history of the first vehicle with a state of deterioration of the fuel cell of the first vehicle determined based on a position of a deteriorated cell in the fuel cell of the first vehicle; and
a controller configured to
receive, via the communication interface, information on a travel history from the second vehicle, and
transmit, via the communication interface to the second vehicle, a notification about the fuel cell of the second vehicle based on the information on the travel history of the second vehicle and the correspondence information, and
the second vehicle is configured to receive the notification from the server apparatus, wherein the state of deterioration of the fuel cell of the first vehicle is determined to be:

deterioration of a membrane when the position of the deteriorated cell in the fuel cell of the first vehicle is on an edge of a stack of cells of the fuel cell;

deterioration of a catalyst when the position of the deteriorated cell in the fuel cell of the first vehicle is near a center of the stack of the cells of the fuel cell;

existence of a contaminated or defective cell when the position of the deteriorated cell in the fuel cell of the first vehicle is a predetermined position from the edge of the stack of the cells of the fuel cell; and age related deterioration when each of the cells in the fuel of the first vehicle is uniformly deteriorated.

7. The system according to claim 6, wherein the correspondence information includes information on an attribute of the first vehicle.

8. The system according to claim 6, wherein the travel history in the correspondence information includes information on a travel route of the first vehicle.

9. The system according to claim 6, wherein the notification includes information on how to handle the fuel cell of the second vehicle.

10. The system according to claim 6, wherein the position of the deteriorated cell in the fuel cell of the first vehicle is estimated based on a current-voltage characteristic of each cell in the fuel cell of the first vehicle.

11. An operating method performed by a server apparatus, the operating method comprising:

storing, in a memory of the server apparatus, correspondence information associating a travel history of a first vehicle configured to run on a fuel cell as a power source with a state of deterioration of the fuel cell determined based on a position of a deteriorated cell in the fuel cell;

receiving information on a travel history from a second vehicle configured to run on a fuel cell as a power source; and transmitting, to the second vehicle, a notification about the fuel cell of the second vehicle based on the information on the travel history of the second vehicle and the correspondence information, wherein the state of deterioration of the fuel cell of the first vehicle is determined to be:

deterioration of a membrane when the position of the deteriorated cell in the fuel cell of the first vehicle is on an edge of a stack of cells of the fuel cell;

deterioration of a catalyst when the position of the deteriorated cell in the fuel cell of the first vehicle is near a center of the stack of the cells of the fuel cell;

existence of a contaminated or defective cell when the position of the deteriorated cell in the fuel cell of the first vehicle is a predetermined position from the edge of the stack of the cells of the fuel cell; and age related deterioration when each of the cells in the fuel cell of the first vehicle is uniformly deteriorated.

12. The operating method according to claim 11, wherein the correspondence information includes information on an attribute of the first vehicle.

13. The operating method according to claim 11, wherein the travel history in the correspondence information includes information on a travel route of the first vehicle.

14. The operating method according to claim 11, wherein the notification includes information on how to handle the fuel cell of the second vehicle.

15. The operating method according to claim 11, wherein the position of the deteriorated cell in the fuel cell of the first vehicle is estimated based on a current-voltage characteristic of each cell in the fuel cell of the first vehicle.

* * * * *